May 19, 1970    TERUAKI KITAMORI ET AL    3,512,251
PRINTED WIRING COMMUTATOR MOTOR
Filed Nov. 28, 1967
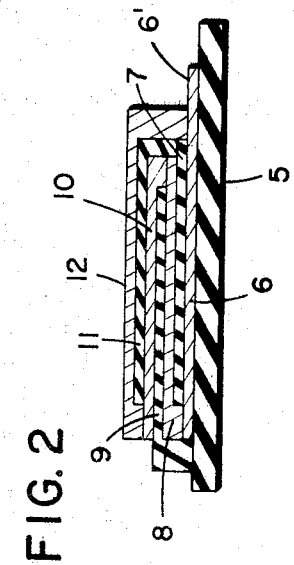
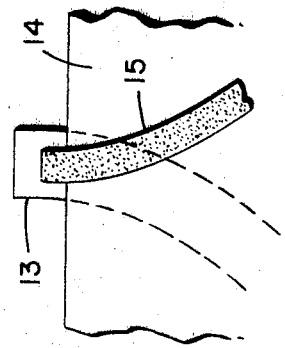
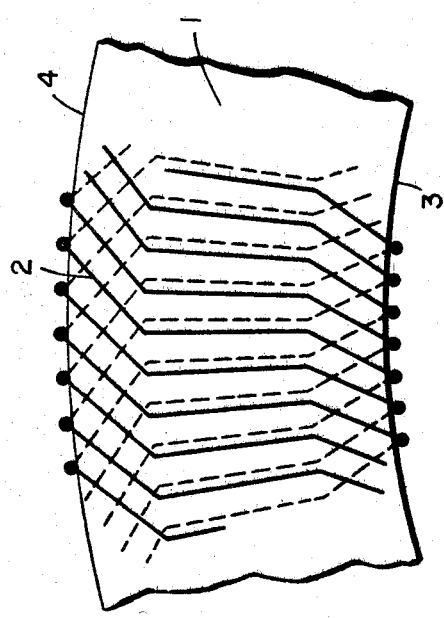
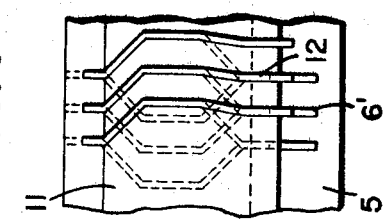
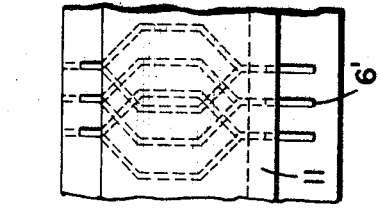
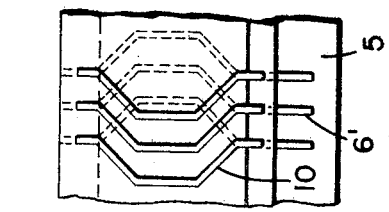
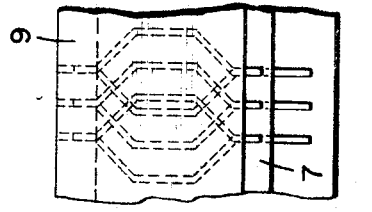
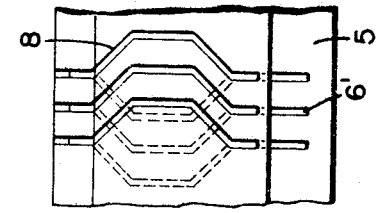
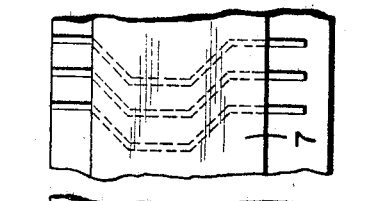
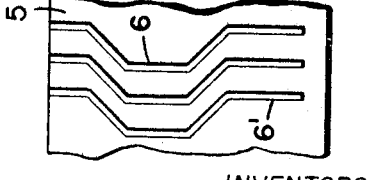
INVENTORS
TERUAKI KITAMORI
NAOZI TAKEDA
HYOGO HIROHATA
BY *Stevens, Davis, Miller & Mosher*
ATTORNEYS United States Patent Office 3,512,251
Patented May 19, 1970

3,512,251
PRINTED WIRING COMMUTATOR MOTOR
Teruaki Kitamori, Hirakata-shi, Naozi Takeda, Osaka, and Hyogo, Hirohata, Neyagawa-shi, Japan, assignors to Matsushita Electric Industries Co., Ltd., Osaka, Japan, a corporation of Japan
Filed Nov. 28, 1967, Ser. No. 686,148
Claims priority, application Japan, Dec. 8, 1966, 41/81,139, 41/81,140
Int. Cl. H01r 43/00
U.S. Cl. 29—597    3 Claims

ABSTRACT OF THE DISCLOSURE

A method for manufacturing a disk-like rotor having multi-layer conductors, in which said rotor conductors are formed by means of a metal powder method. Insulator films between the conductors are printed with an insulating resin in another portion than the portions necessary for connecting upper layer coductors to lower layer conductors. The upper layer conductors are formed on the insulating layers therefor by means of the metal powder method, whereby when the upper layer conductors are formed by means of non-electroplating, the electrical connecting portions between the upper and lower layer conductors are simultaneously metallized and thereby the electrical connection between the upper and lower layer conductors is performed without requiring time and trouble.

---

This invention relates to a method for manufacturing a commutator motor having a disk-like rotor comprising a disk-like base plate having insulated surfaces with a winding formed thereon by a printed wiring method.

Heretofore, a motor of this kind had a large number of face to face connections of conductors and required a substantial amount of time and trouble in effecting the connections.

Accordingly, it is a primary object of this invention to provide a printed wiring commutator motor free from such disadvantages.

Other objects, features and advantages of this invention will become apparent from the following description taken in conjunction with the accompanying drawings in which:

FIG. 1 is a schematic plan view showing the main portion of a conventional disk-like rotor;

FIG. 2 is a partial sectional view of the disk-like rotor according to an embodiment of this invention;

FIGS. 3 to 9 show the manufacturing steps of the disk-like rotor according to this invention; and FIGS. 10 and 11 are views useful for explaining how to connect conductors with each other.

In order to give a better understanding of the present invention, with reference to FIG. 1 description will first be made of a conventional printed rotor for use with a D.C. motor which is most commonly used. In this conventional printed rotor, conductor strips formed by etching or punching a copper plate are adhered to the opposite surfaces of a disk-like insulator base plate 1 in such a manner that each of these conductor strips forms one half of each winding turn 2, and then each of the conductor strips on the front surface of the base plate 1 is connected with the corresponding conductor strip on the reverse surface at the inner and outer edge portions 3 and 4 of the base plate to form one complete winding turn. FIG. 1 shows the case of wave winding, wherein the solid lines indicate the conductor strips provided on the front surface of the base plate, the dotted lines represent the conductor strips provided on the reverse surface of the base plate, and black dots show the connecting portions. The disk is partially shown.

In the case of such printed rotor, however, the number of connection portions which can be accommodated at the inner and outer portions of the base plate is limited in respect of space. Thus, it is impossible to increase the number of turns of a winding. Therefore, the use of such a conventional printed rotor results in a low voltage-high current motor.

In accordance with this invention, there is provided a rotor free from the above drawbacks. FIG. 2 is a partial sectional view of the rotor according to an embodiment of this invention, and FIGS. 3 to 9 show the manufacturing steps thereof.

Although, in accordance with this invention, printed wiring may be performed solely by using a novel printed wiring method called "metal powder method" which utilizes non-electroplating, it is possible to use in combination therewith the well-known electroplating method to decrease required manufacturing time. In the metal powder method, an adhesive agent is first printed on an insulator base plate in a predetermined wiring pattern, and then metal powder which will serve as a catalyst for the reduction reaction or copper powder is sprinkled over and fixed on the printed adhesive agent. Although in this state the resistance between particles of, for example, copper powder is rather high and therefore the conductivity of the powder is not high enough, by further immersing the base plate treated as above-described in an alkali solution of copper complex salt containing formalin so as to reduce and precipitate copper ions over the copper particles to make electrical interconnection between the particles with the precipitated copper particles, the metal powder will form a conductor of high conductivity.

Although this invention can be applied to any type of winding such as lap winding, wave winding, concentric winding, etc., description will be made herein of the case where the present invention is applied to lap winding.

First, an adhesive agent is printed on an insulator base plate 5 in such a pattern as shown in FIG. 3. Subsequently, copper powder is sprinkled onto said adhesive agent so as to be absorbed thereto, and copper plating is effected by the non-electroplating method until good conductivity is retained between copper grains. Subsequently, electroplating is effected by any conventional method using as a terminal the portion in which the entire conductors are connected with each other as indicated on the upper side of FIG. 3. Thus, there is fromed a printed wiring 6 configured in such a pattern as shown in FIG. 3. The electroplating method just described is used to shorten the manufacturing time since the time efficiency of this method is high as compared with that of the non-electroplating method. As final step, the aforementioned connection portions of the entire conductors are cut off. The resultant printed wiring 6 serves as the left side of a first coil, and an elongated portion 6′ of the wiring 6 is adapted to serve as a commutator at the same time.

Thereafter, insulating paint 7 is applied in such a manner that only the opposite end portions of said printed wiring 6 are exposed, as shown in FIG. 4, and an adhesive agent is printed on the insulating paint 7 in such a pattern as shown in FIG. 5. Thus, a printed wiring 8 is formed by the same method as that of the printed wiring 6. In this case, the printed wiring 8 serves as the right side of the first coil. The printed wiring 8 has its upper end portion connected with the printed wiring 6 and its lower end portion insulated by means of the insulating paint film 7.

Subsequently, insulating paint 9 is applied in such a manner that only the lower end portion of said printed wiring 8 is exposed, as shown in FIG. 6. Then, an adhesive agent is printed on the insulating paint 9 in such a pattern as shown in FIG. 7. Thus, a printed wiring 10 is similarly formed. In this case, the printed wiring 10 serves as the left side of a second coil, and it has its upper end portion insulated from the printed wiring 8 by the insulating paint film 9 and its lower end portion connected with the printed wiring 8.

Next, insulating paint 11 is applied at a position as shown in FIG. 8 or at the same position as that in FIG. 4 in such a manner that only the upper end portion of said printed wiring 10 is exposed. Thereafter, an adhesive agent is printed on the insulating paint in such a pattern as shown in FIG. 9. Thus, a printed wiring 12 is similarly formed. In this case, the printed wiring 12 serves as the right side of the second coil, and it has its upper end portion connected with the printed wiring 10 and its lower end portion connected with the printed wiring 6 which constitutes the second printed wiring.

By forming printed wirings and insulating paint films alternately, there is produced a printed rotor of such a sectional configuration as shown in FIG. 2 having a lap winding provided thereon each coil of which is composed of two turns of winding. (In practice, the printed wiring 12 is not connected with the corresponding printed wiring 6 but with the neighboring one.)

Any desired number of turns of winding can be obtained by increasing the number of the printed wirings and the insulating paint films superposed upon each other, if necessary.

With a motor of this type, the connection between the conductors with an insulating paint film interposed therebetween is most critical, and such connection can be achieved in such a manner as shown in FIGS. 10 and 11. In FIG. 10, the reference numeral 13 represents a lower conductor, and 14 an insulating film. An adhesive agent is printed in a pattern 15 which corresponds to an upper conductor to be connected with the lower conductor 13. Part of the pattern 15 lies directly on the lower conductor 13. Then, conductor formation is effected by the aforementioned metal powder method to form the upper conductor 16. The lower and upper conductors 13 and 16 are connected with each other at 17 as shown in section by FIG. 11. That is, the connection is automatically achieved simultaneously with the conductor formation. It is to be noted that the method just described is advantageous in that the trouble of separately forming such connection can be saved.

In order to flatten the portion to be used as commutator and widen the life span thereof, such portion may be plated with a metal such as silver, rhodium or the like. Alternatively, the commutator portion may be composed of copper layers formed by cutting a copper plate by any suitable method. In either case, great practical effects can be obtained.

As will be appreciated from the foregoing, in accordance with this invention, a multi-layer winding is formed on a disk-like insulator base plate by successively superimposing printed wirings and insulating paint films upon each other, and the insulating paint films are alternately deviated in position from each other radially of the insulator base plate. Thus, the number of winding turns can be increased so that it is possible to manufacture a high voltage-low current motor which can be driven directly by a commercial power supply. Furthermore, the connection between coil sides can be facilitated so that such motor may be manufactured on a mass-production basis.

What is claimed is:

1. A method for manufacturing a rotor of a printed wiring, multi-layer winding commutator comprising the steps of forming on a disk-like base plate having insulated surfaces a first conductive layer, forming a first insulating film offset on said first conductive layer to leave a portion thereof exposed, forming a second conductive layer on said first insulating film in vertical alignment with said first conductive layer, forming on said second conductive layer a second insulating film offset in the opposite direction from said first insulating film leaving a portion of said second conductive layer exposed, and repeating the aforementioned steps until the desired number of layers are formed, the adjacent conductive layers being in electrical contact through their exposed portions.

2. The method according to claim 1 in which said conductive layers are formed by a metal powder method.

3. The method according to claim 1 in which said conductive layers are formed by a combination metal powder and electroplating method.

References Cited

UNITED STATES PATENTS

| 3,084,420 | 4/1963 | Burr | 310—268 |
| 3,165,657 | 1/1965 | Henry-Baudot | 310—268 |
| 3,171,051 | 2/1965 | Burr | 310—268 |
| 3,231,774 | 1/1966 | Henry-Baudot | 310—268 |
| 3,382,570 | 5/1968 | Knapp | 310—268 |

MILTON O. HIRSHFIELD, Primary Examiner

R. SKUDY, Assistant Examiner

U.S. Cl. X.R.

29—420, 598, 625; 310—44, 237, 269